March 25, 1930.　　　A. W. DEAN　　　1,751,980
LOOP BEARING
Filed Aug. 15, 1927
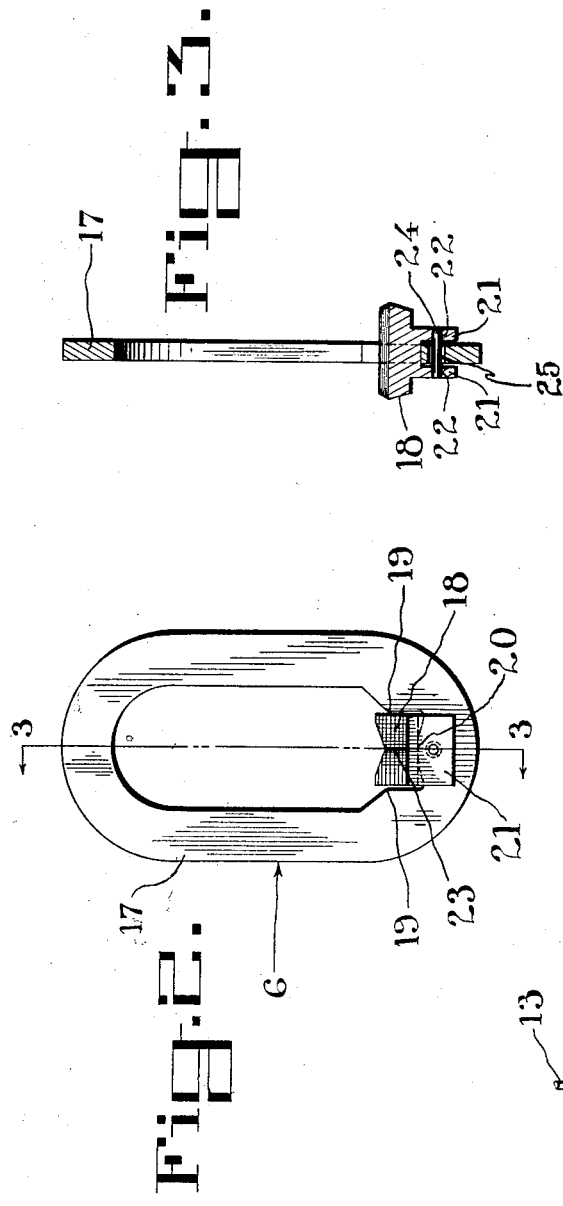
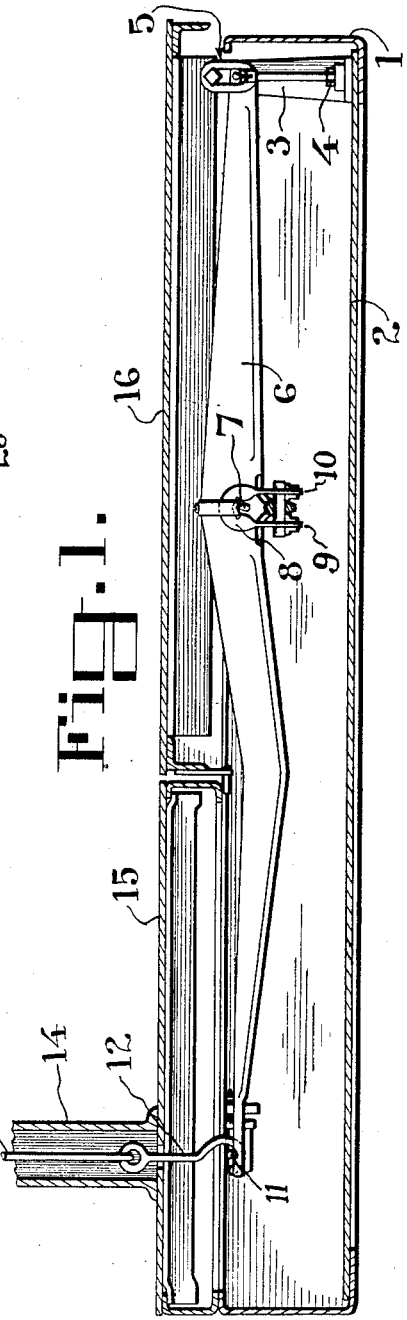
INVENTOR
ANDREW W. DEAN
BY
*Henry Sherman*
ATTORNEY Patented Mar. 25, 1930

1,751,980

UNITED STATES PATENT OFFICE

ANDREW W. DEAN, OF ST. JOHNSBURY, VERMONT, ASSIGNOR TO E. AND T. FAIRBANKS AND COMPANY, OF ST. JOHNSBURY, VERMONT, A CORPORATION OF VERMONT

LOOP BEARING

Application filed August 15, 1927. Serial No. 213,105.

This invention relates to weighing scales and more particularly to loop bearings which are adapted to cooperate with the various knife edge pivots employed in scale construction.

Devices of this character, as heretofore commonly constructed, comprised a loop with a hardened member adapted to receive the knife edge pivot of a scale beam or lever and to this end one well-known bearing is constructed of an angular metal plate of hardened steel loosely seated in a suitable opening in a loop member. It has been found that the hardened steel bearing member was frequently broken when a load was placed upon the scale platform. It is accordingly an object of this invention to provide a bearing structure strong enough to withstand any strain incident to scale use.

Another object of this invention is the provision of an improved loop bearing construction wherein the bearing is self-aligning, the construction being such that the bearing is capable of a limited lateral and longitudinal oscillatory motion and also a limited motion transversely of the loop element to allow the bearing to swing from side to side in a horizontal plane.

Other objects of this invention, together with certain details of construction and combinations of parts, will be more particularly described by reference to the accompanying drawings and pointed out in the appended claims.

In the accompanying drawings:

Fig. 1 is a side elevational view in section of a platform, or dormant, scale provided with loop bearings constructed in accordance with my invention;

Fig. 2 is a front elevational view of a loop bearing embodying my invention; and Fig. 3 is a cross-sectional elevation of the loop bearing taken on line 3—3 in Fig. 2.

Similar characters of reference indicate corresponding parts throughout the several views.

The improved bearing is applicable to various kinds of scales but is shown in the drawings as applied to a dormant scale of the type disclosed in the co-pending application of Alfred Bousfield, Serial Number 187,221, filed April 28, 1927.

Referring to Figure 1, there is shown a frame, or housing, 1 of channel iron formation, the flanges of which are inturned. A metal plate 2 is suitably secured to the lower flanges of the frame and constitutes the base of the scale. A fulcrum stand 3 is mounted on the base and is suitably fastened thereto by means of bolts 4. Fulcrumed on stand 3 through the medium of a loop bearing of my improved construction, generally indicated by the reference numeral 5, is a transverse extension lever 6, said extension lever having a knife-edge pivot 7 extending therethrough on which is pivotally supported a link 8 having integral therewith two loop bearings 9 and 10 substantially similar in construction to loop bearing 5. The loop bearings 9 and 10 have suspended therefrom the main levers (not shown) of the scale, as is well understood in the art. In the tip end of the transverse extension lever is carried a knife edge pivot 11 which is suitably connected to a counter-balancing organization (not shown) through the medium of a steelyard hook 12 and steelyard rod 13 extending upwardly through a tube 14 mounted on a neck plate 15. A platform 16 is sustained on the main levers in the customary and well known manner.

The loop bearing comprises a loop 17 and a steel bearing block 18. The loop is constricted at its lower end to form bearing portions 19 adapted to limit the lateral oscillation of the bearing block, and at the base of the opening of the loop a rounded projection 20 is formed integral therewith and in the plane of the loop on which the bearing block is adapted to rest and upon which it is free to tilt and rock that it may adapt itself to the knife edge pivot.

The steel bearing block 18 has a V-groove milled in its upper surface longitudinally thereof, the block being then hardened in order that the friction between the groove and knife edge pivot cooperating therewith be reduced to a minimum. Extending from the bottom surface of the bearing block and integral therewith are a pair of legs 21.

These legs are spaced from the ends of the bearing block and extend across the full width thereof at right angles to the plane of the V-groove. Aligned apertures 22 are formed in the legs. The bearing block is tapered at its ends to form V-shaped bearing portions 23 offering a minimum bearing surface when contacting with a scale element.

In assembling the loop bearing, the legs 21 straddle the base of the loop, being spaced from the side faces of the loops, and the portion of the under surface of the bearing block between said legs rests on the rounded projection 20. A pin 24 received in apertures 22 and passing through aperture 25 in loop 17 is adapted to retain the bearing block on said loop.

It will be noted that the aperture is of larger diameter than the pin to form a loose bearing in which the pin 24 is journaled, this construction being for the purpose of allowing the bearing block to swing from side to side in a horizontal plane.

My improved loop bearing can be produced at a comparatively low cost, a number of them being simultaneously formed from a bar of steel. The bearing is very strong and is not liable to get out of order and can be easily replaced, when worn, by a new one in order to maintain the accuracy of the scale.

It will thus be seen that I have produced a self-aligning loop bearing construction which will have a line to line contact with the knife edge pivot at all times and which will be free to oscillate in a direction longitudinally of the V-groove of the bearing, also transversely or laterally, of the groove and from side to side in a horizontal plane.

Having thus described my invention, what I claim as new and desire to secure by Letters Patent of the United States, is:

1. A loop bearing for scales comprising a loop member and a bearing block, spaced from the sides of said loop member to permit lateral oscillation of said bearing block seated on said loop member, said bearing block having a groove in one surface thereof and a plurality of legs extending from the opposite surface, said legs straddling said loop member.

2. A loop bearing for scales comprising a loop member and a bearing block, spaced from the sides of said loop member to permit lateral oscillation of said bearing block seated on said loop member, said bearing block having a groove in the upper surface thereof and a plurality of legs depending therefrom, said legs having a plane surface at right angles to the plane of the groove.

3. A loop bearing comprising a loop member and a bearing block, spaced from the sides of said loop member to permit lateral oscillation of said bearing block pivotally seated on said loop member, said bearing block having a groove in one surface thereof and a plurality of legs extending from the opposite surface, said legs having a plane surface at right angles to the plane of the groove.

4. A loop bearing for scales comprising a loop member having a projection thereon and a bearing block spaced from the sides of said loop member to permit lateral oscillation of said bearing block rockably seated on said projection, said bearing block having a groove in one surface thereof and a plurality of legs extending from the opposite surface, the ends of said bearing block being V-shaped and adapted to act as friction points.

5. A loop bearing for scales comprising a loop member having a rounded projection extending into the opening thereof and a bearing block spaced from the sides of said opening to permit lateral oscillation of said bearing block seated on said projection, said bearing block having a groove in one surface thereof and a plurality of legs extending from the opposite surface, said legs straddling said projection.

6. A loop bearing for scales, comprising a loop member having a rounded projection extending in the opening thereof and a bearing block spaced from the sides of said opening to permit lateral oscillation of said bearing block pivotally mounted on said loop member adapted to be rockably seated on said projection, said bearing block having a plurality of legs extending therefrom, said legs straddling said projection.

7. A loop bearing for scales comprising a loop member having a rounded projection extending into the opening thereof and an aperture substantially in vertical alignment with the apex of said projection and a bearing block spaced from the sides of said opening to permit lateral oscillation of said bearing block seated on said projection, said bearing block having a plurality of legs extending therefrom and a pin in said legs, said pin being journaled in said aperture.

8. A loop bearing for scales comprising a loop member having a rounded projection extending into the opening thereof and an aperture substantially in vertical alignment with the apex of the projection and a bearing block spaced from the sides of said opening to permit lateral oscillation of said bearing block seated on said projection, said bearing block having a plurality of legs extending therefrom and a pin in said legs, said pin being journaled in said aperture, said aperture being larger in diameter than the diameter of the pin.

9. A loop bearing for scales comprising a loop member having a portion thereof constricted to form bearing surfaces and a round projection in said constricted portion integral with said loop member, said loop member having an aperture substantially in vertical alignment with the apex of said projection and a bearing block spaced from said bearing surfaces to permit lateral oscillation of said bearing block seated on said projection having a plurality of legs extending therefrom and a pin in said legs, said pin being journaled in said aperture.

In testimony whereof I have signed my name to this specification.

ANDREW W. DEAN.